(12) United States Patent
Miyata

(10) Patent No.: US 9,143,222 B2
(45) Date of Patent: Sep. 22, 2015

(54) WIRELESS COMMUNICATION SYSTEM, COMMUNICATION CONTROL METHOD, AND RELAY STATION

(71) Applicant: KYOCERA Corporation, Kyoto-shi, Kyoto (JP)

(72) Inventor: Takeo Miyata, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 14/352,143

(22) PCT Filed: Oct. 24, 2012

(86) PCT No.: PCT/JP2012/077420
§ 371 (c)(1),
(2) Date: Apr. 16, 2014

(87) PCT Pub. No.: WO2013/061986
PCT Pub. Date: May 2, 2013

(65) Prior Publication Data
US 2014/0295751 A1    Oct. 2, 2014

(30) Foreign Application Priority Data
Oct. 27, 2011  (JP) .................................. 2011-235794

(51) Int. Cl.
*H04B 7/15* (2006.01)
*H04B 7/155* (2006.01)
*H04W 16/26* (2009.01)

(52) U.S. Cl.
CPC ............... *H04B 7/155* (2013.01); *H04W 16/26* (2013.01)

(58) Field of Classification Search
USPC ................ 455/3.02, 427, 428, 430, 431, 7–9, 455/11.1, 12.1, 13.1, 13.2, 14–17; 370/226, 370/293, 246, 274, 279, 315, 316, 492, 401
See application file for complete search history.

(56) References Cited

U.S. PATENT DOCUMENTS

| 7,184,703 B1 * | 2/2007 | Naden et al. ..................... 455/10 |
| 7,424,295 B2 * | 9/2008 | Isobe et al. ..................... 455/436 |

(Continued)

FOREIGN PATENT DOCUMENTS

| JP | 2002-252587 A | 9/2002 |
| JP | 2003-101465 A | 4/2003 |

(Continued)

OTHER PUBLICATIONS

International Preliminary Report on Patentability dated Apr. 29, 2014 issued for International Application No. PCT/JP2012/077420.

(Continued)

*Primary Examiner* — Dominic E Rego
(74) *Attorney, Agent, or Firm* — Procopio, Cory, Hargreaves & Savitch LLP

(57) ABSTRACT

The present invention relates to a wireless communication system, a communication control method, and a relay station. The wireless communication system includes: a wireless terminal; a plurality of base stations; and a relay station, wherein the relay station defines a wirelessly communicable base station among the plurality of base stations as a candidate for a master station, in a case where a plurality of the candidates for the master station are present, acquires priority order setting information for setting priority orders of connection regarding the respective candidates for the master station, and sets the priority orders of the connection based on the priority order setting information. Then, in a case where the relay station has received a connection request from the wireless terminal, the control unit decides a candidate for the master station, which has a highest priority order of the connection, as an optimal master station.

9 Claims, 11 Drawing Sheets

(56) References Cited

U.S. PATENT DOCUMENTS

| | | | |
|---|---|---|---|
| 7,664,458 B2* | 2/2010 | Ishii et al. | 455/7 |
| 7,720,020 B2* | 5/2010 | Larsson | 370/315 |
| 8,107,967 B2* | 1/2012 | Horiuchi et al. | 455/450 |
| 8,175,064 B2* | 5/2012 | Tan et al. | 370/335 |
| 2004/0106373 A1* | 6/2004 | Shimada et al. | 455/9 |
| 2008/0031174 A1* | 2/2008 | Saifullah et al. | 370/311 |
| 2008/0056199 A1* | 3/2008 | Park et al. | 370/332 |
| 2008/0285500 A1* | 11/2008 | Zhang et al. | 370/315 |
| 2009/0147728 A1* | 6/2009 | Atia et al. | 370/321 |
| 2010/0110968 A1* | 5/2010 | Lee et al. | 370/315 |
| 2012/0202416 A1* | 8/2012 | Naden et al. | 455/7 |
| 2012/0202503 A1 | 8/2012 | Kitaji | |
| 2012/0295626 A1 | 11/2012 | Kitaji | |
| 2013/0052941 A1 | 2/2013 | Kitaji | |

FOREIGN PATENT DOCUMENTS

| | | |
|---|---|---|
| JP | 2007-318594 A | 12/2009 |
| JP | 2011-155401 A | 8/2011 |
| JP | 2011-166595 A | 8/2011 |
| WO | 2011/030836 A1 | 3/2011 |
| WO | 2011/093324 A1 | 8/2011 |

OTHER PUBLICATIONS

International Search Report dated Nov. 20, 2012, issued for International Application No. PCT/JP2012/077420.

CATT, CATR, NAS recovery for RN, 3GPP TSG RAN WG2 Meeting #70 R2-102790, May 10-14, 2010, Montreal, Canada.

Office Action dated Jul. 28, 2015 issued in counterpart Japanese application No. 2013-540798.

* cited by examiner

RELAY STATION CAPACITY

| RP-MS1 | | RP-BSX | |
|---|---|---|---|
| C | T | C | T |
| T | T | T | T |

(b)

MASTER STATION CAPACITY

| BSX-MS2 | | RP-BSX | |
|---|---|---|---|
| T | T | C | T |
| T | T | T | T |

FIG. 7

| | NOT RELAYED | RELAYED |
|---|---|---|
| RELAY STATION | 1C6T | 3 CALLS (REDUCED BY 3T) |
| MASTER STATION | 1C6T | 4 CALLS (REDUCED BY 2T) |
| TOTAL | 12 CALLS | REDUCED BY 5T |

WIRELESS COMMUNICATION SYSTEM, COMMUNICATION CONTROL METHOD, AND RELAY STATION

TECHNICAL FIELD

The present invention relates to a wireless communication system, a communication control method, and a relay station, and particularly, relates to a wireless communication system, a communication control method, and a relay station, which relay a communication signal by using a wireless entrance line.

BACKGROUND ART

There is a wireless entrance line using a wireless line as an entrance line, which is a transmission line that connects a base station and a host-side base station to each other, or connects base stations to each other. Application of this wireless entrance line to a wireless communication system is effective for turning an area, on which an optical line, an ISDN line or the like cannot be laid, to a communication area, and moreover, can reduce running cost of the wireless communication system by reducing maintenance cost since a wired communication system is not used.

For example, in Patent Document 1, a configuration is shown, in which a line control device and a base station are connected to each other by a wireless entrance line by providing a wireless relay station in such a case where the line control device and the base station cannot be connected to each other by a wired entrance line in a blind zone, a mountain range or the like, at which a radio wave from the base station cannot arrive.

PRIOR ART DOCUMENT

Patent Document

Patent Document 1: Japanese Patent Application Laid-Open No. 2002-252587

SUMMARY OF INVENTION

Problems to be Solved by the Invention

In a case of relaying a signal by wireless communication by providing the wireless relay station, a communication capacity is each consumed in such a relay source and such a relay destination, and accordingly, there is a problem that the communication capacity is decreased in comparison with a case of not performing the relay.

Moreover, in a case of relaying communication from a wireless terminal to the base station, it is general that the wireless relay station operates so as to give priority orders to relay destinations (master stations) in order to access a base station, in which wireless performance is optimal when viewed from the wireless relay station itself, as a candidate for a first relay destination, and in order to set a base station, in which the wireless performance is next excellent, as a candidate for a second relay destination, and so as to access the candidate for the second relay destination in a case where the communication capacity of the candidate for the first relay destination is filled up.

When such an operation is performed, in a case where there is a base station, which is common as a candidate for a first master station to a plurality of the wireless relay stations, then there has been a possibility that the base station may not be able to operate as a usual base station since the communication is concentrated on the base station and the communication capacity of the base station is completely consumed for the relay. In this case, there has been a problem that a connection-disabled state owing to a busy state of slots occurs frequently in a communication area of the base station.

The present invention has been made in order to solve the problem as described above, and it is an object of the present invention to provide a wireless communication system, which provides a wireless relay station and transfers a signal between a communication terminal and a base station by a wireless entrance line, the wireless communication system being capable of preventing the connection-disabled state from occurring frequently by suppressing the concentration of the communication to a specific master station, and to provide a communication control method and a relay station.

Means for Solving the Problems

In order to solve the foregoing problem, a wireless communication system according to the present invention includes: a wireless terminal; a plurality of base stations which perform wireless communication with the wireless terminal; and a relay station that relays the wireless communication between the plurality of base stations and the wireless terminal, characterized in that the relay station includes: a control unit that defines a wirelessly communicable base station among the plurality of base stations as a candidate for a master station, in a case where a plurality of the candidates for the master station are present, acquires priority order setting information for setting priority orders of connection regarding the respective candidates for the master station, and sets the priority orders of the connection based on the priority order setting information, and in a case where the relay station has received a connection request from the wireless terminal, the control unit decides a candidate for the master station, the candidate having a highest priority order of the connection, as an optimal master station, and performs wireless connection to the optimal master station.

In an aspect of the wireless communication system according to the present invention, the priority order setting information includes received signal strength indications of downlink signals from the plurality of base stations or carrier to interference-plus-noise ratios of the downlink signals, and the control unit sets the priority orders of the connection so that the priority orders can be higher in order where the received signal strength indications or the carrier to interference-plus-noise ratios are better.

In an aspect of the wireless communication system according to the present invention, the priority order setting information includes past available margin information in respective time zones of a day in the plurality of base stations, and the control unit sets the priority orders of the connection so that the priority orders can be higher in order where available margins are larger.

In an aspect of the wireless communication system according to the present invention, the plurality of base stations issue alarms as notification information to the relay station in a case of having determined that there is no margin for communication capacities, the priority order setting information includes past alarm information in respective time zones of a day in the plurality of base stations, the alarm information includes whether or not to have issued the alarms and a number of alarm issuance times in a same time zone, and the control unit sets the priority orders of the connection to be lower, the priority orders being concerned with the base stations which have issued the alarms, and in addition, sets the priority orders of the connection to be lower in order where the number of alarm issuance times is larger in the same time zone.

In an aspect of the wireless communication system according to the present invention, the priority order setting information includes information of types of the plurality of base stations and of a type of a line for the plurality of base stations, the types of the base stations are classified based on whether a communication capacity is higher or lower, the type of the line is classified based on whether a line for use is wired or wireless, the control unit sets the priority order of the connection to be higher, the priority order being concerned with a base station having a first capacity as a communication capacity, and sets the priority order of the connection to be lower, the priority order being concerned with a base station having a second capacity lower than the first capacity, and sets the priority order of the connection to be higher, the priority order being concerned with a base station in which the line for use is wired, and sets the priority order of the connection to be lower, the priority order being concerned with a base station in which the line for use is wireless.

In an aspect of the wireless communication system according to the present invention, after deciding the optimal master station, the control unit changes the priority order of the connection of the optimal master station to a lowest order, raises the priority orders of the connection of other candidates for the master station individually by one stage, and sets new priority orders of the connection.

In an aspect of the wireless communication system according to the present invention, in a case where wireless communication with any of the plurality of base stations is ended after setting the priority orders of the connection, the control unit raises the priority order of the connection by a predetermined number of stages, the priority order being concerned with the base station in which the communication is ended, and sets new priority orders of the connection.

A communication control method according to the present invention is a communication control method of a wireless communication system including: a wireless terminal; a plurality of base stations which perform wireless communication with the wireless terminal; and a relay station that relays the wireless communication between the plurality of base stations and the wireless terminal, the communication control method including the steps of: (a) in the relay station, defining a wirelessly communicable base station among the plurality of base stations as a candidate for a master station, in a case where a plurality of the candidates for the master station are present, acquiring priority order setting information for setting priority orders of connection regarding the respective candidates for the master station, and setting the priority orders of the connection based on the priority order setting information; and (b) in the relay station, in a case where the relay station has received a connection request from the wireless terminal, deciding a candidate for the master station, the candidate having a highest priority order of the connection, as an optimal master station, and performing wireless connection to the optimal master station.

A relay station according to the present invention is a relay station that relays wireless communication between a plurality of base stations and a wireless terminal, the relay station including: a control unit that defines a wirelessly communicable base station among the plurality of base stations as a candidate for a master station, in a case where a plurality of the candidates for the master station are present, acquires priority order setting information for setting priority orders of connection regarding the respective candidates for the master station, and sets the priority orders of the connection based on the priority order setting information, in a case where the relay station has received a connection request from the wireless terminal, the control unit decides a candidate for the master station, the candidate having a highest priority order of the connection, as an optimal master station, and performs wireless connection to the optimal master station.

Effects of the Invention

In accordance with the wireless communication system according to the present invention, in the case where the plurality of candidates for the master station are present, the priority orders of the connection are set for the respective candidates for the master station, in the case where the connection request from the wireless terminal is received, the candidate for the master station, which has the highest priority order of the connection, is decided as the optimal master station, and the wireless connection to the optimal master station is performed. Accordingly, the connection-disabled state can be prevented from occurring frequently by suppressing the concentration of the communication to the specific master station.

In accordance with the communication control method according to the present invention, in the case where the plurality of candidates for the master station are present, the priority orders of the connection are set for the respective candidates for the master station, in the case where the connection request from the wireless terminal is received, the candidate for the master station, which has the highest priority order of the connection, is decided as the optimal master station, and the wireless connection to the optimal master station is performed. Accordingly, the connection-disabled state can be prevented from occurring frequently by suppressing the concentration of the communication to the specific master station.

BRIEF DESCRIPTION OF DRAWINGS

FIG. 6 is views schematically showing a consumption state of time slots.

FIG. 7 is a view showing differences in time slot between a case of performing a relay operation and a case of not performing the relay operation.

DESCRIPTION OF EMBODIMENT

<Introduction>

Figure 1:
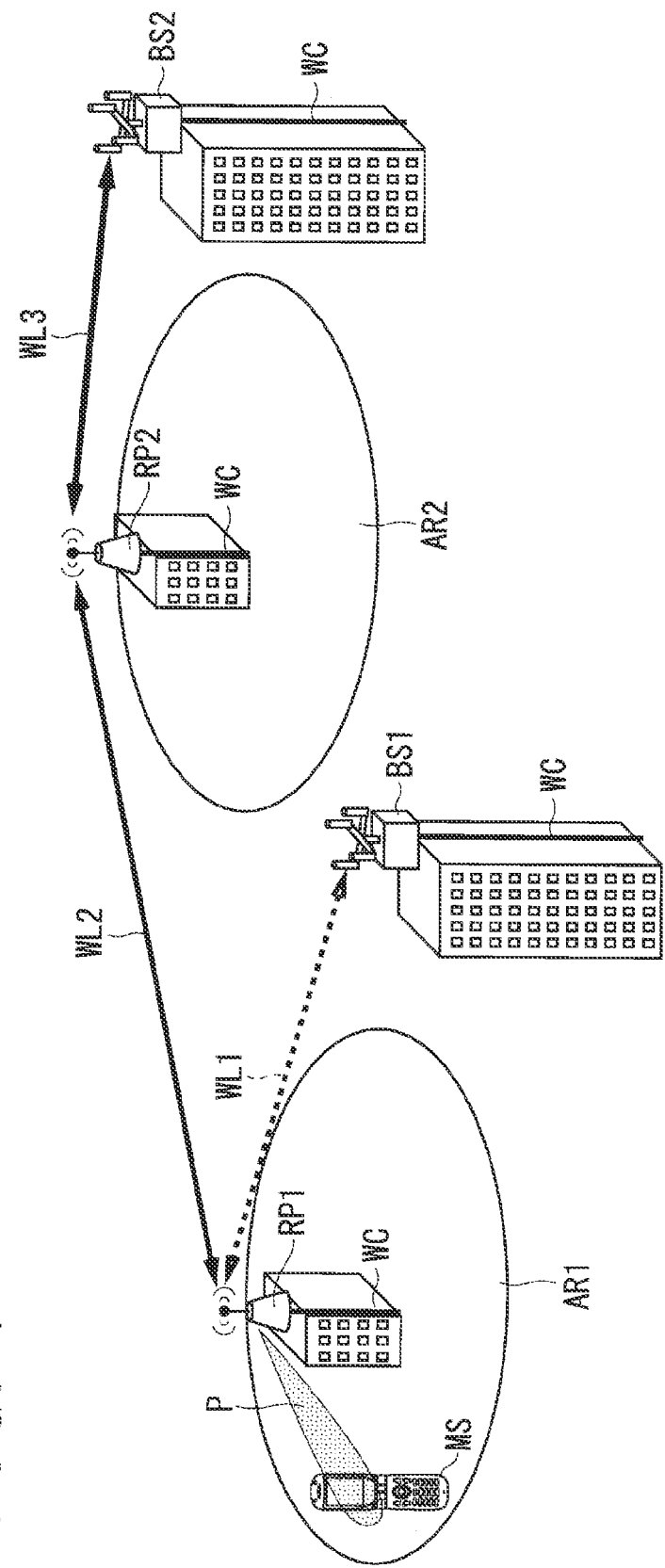
FIG. 1 is a view schematically showing relay communication by a wireless communication system using a wireless entrance line.
Figure 2:
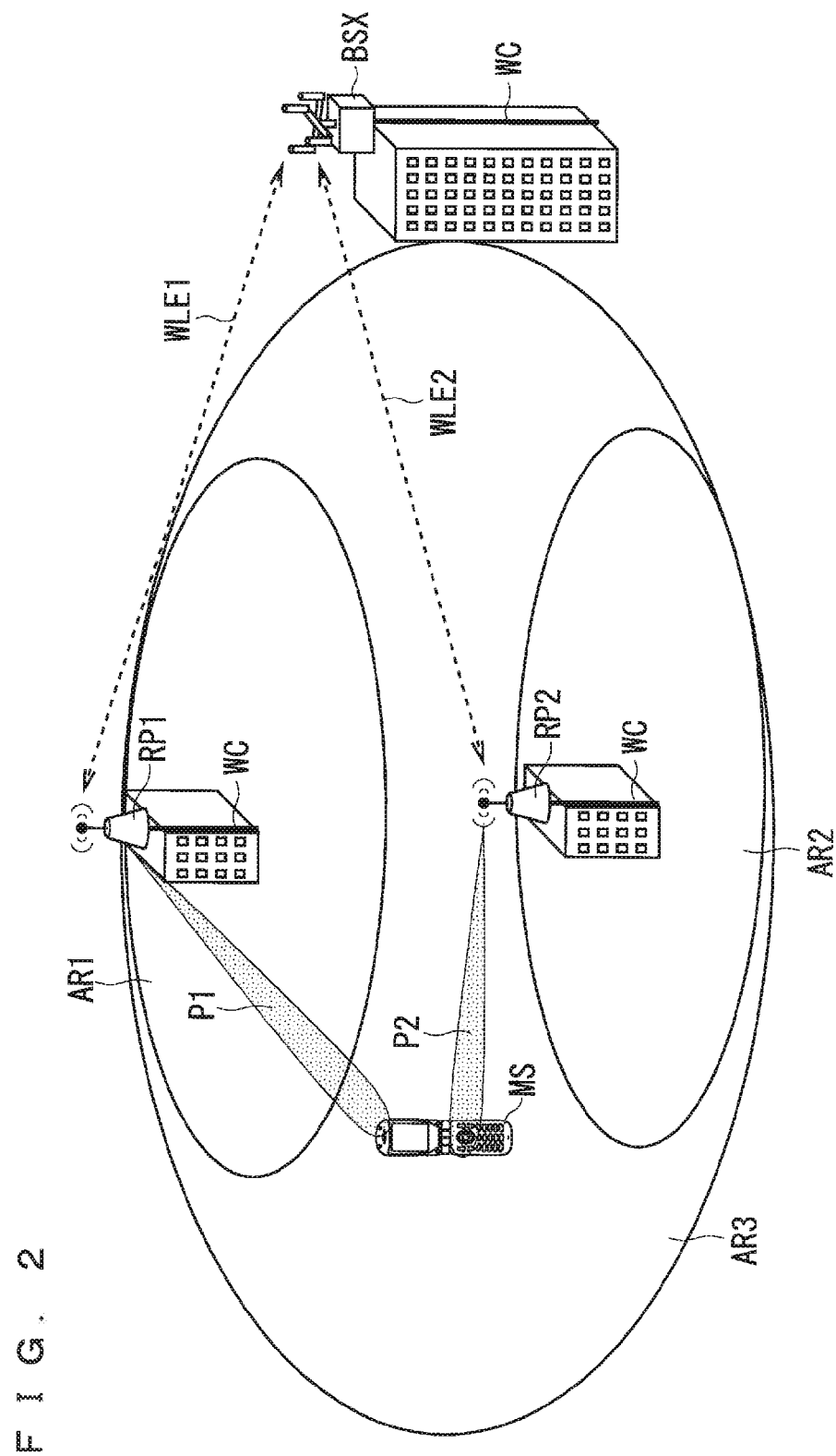
FIG. 2 is a view schematically showing CoMP transmission/reception by the wireless communication system using the wireless entrance line.

Prior to a description of an embodiment, a description is made of advantages of a wireless communication system, which transfers a signal between a communication terminal and a base station by a wireless entrance line, by using FIG. 1 and FIG. 2.

FIG. 1 is a view schematically showing relay communication by the wireless communication system using the wireless entrance line.

In FIG. 1, as a master station, a base station BS1 connects to a relay station RP1 by a wireless entrance line WL1, and performs communication with a wireless terminal MS through the relay station RP1.

Here, a communicable area of the relay station RP1 with the wireless terminal MS is AR1, and meanwhile, the base station BS1 performs wireless communication with the relay station RP1 from an outside of the communicable area AR1 through the wireless entrance line WL1.

In such a configuration, in a case where a link between the relay station RP1 and the base station BS1 through the wireless entrance line WL1 is disconnected, for example, in a case where the base station BS1 is in a busy state of slots, or in a case where the base station BS1 comes not to operate owing to a failure or an outage, the relay station RP1 attempts to link with a new master station.

However, in a case where the new master station is not present in a range where the relay station RP1 can connect thereto by the wireless entrance line, then as a next best solution, the relay station RP1 searches a relay station RP2 in a range where the relay station RP1 is connectable thereto by the wireless entrance line, and opens a wireless entrance line WL2 with the relay station RP2.

Here, a communicable area AR2 of the relay station RP2 and the communicable area AR1 of the relay station RP1 are apart from each other without overlapping each other, and meanwhile, a connection range by the wireless entrance line is much wider than the same.

The relay station RP2 is connectable to a base station BS2 as a master station by a wireless entrance line WL3, and the relay station RP1 can connect to the base station BS2 through the relay station RP2 by the wireless entrance lines WL2 and WL3.

As described above, multi-stage link formation is enabled by establishing the connection through a plurality of the relay stations, and it becomes possible to maintain a communication network also in an event of emergency such as a disaster.

FIG. 2 is a view schematically showing CoMP (Coordinated MultiPoint) transmission/reception by the wireless communication system using the wireless entrance line.

In FIG. 2, the relay stations RP1 and RP2 are connectable to a base station BSX through wireless entrance lines WLE1 and WLE2, respectively.

Therefore, the connection by a wired line WC through the network, the connection having been necessary heretofore, does not necessarily become necessary.

That is to say, it has been necessary for each of the conventional base stations to be connected to a host device (not shown) through the wired line WC such as an optical line and an ISDN line, and it has been necessary for information transfer between the respective base stations to be performed via the network (wired network) by the wired line WC.

In order to realize the CoMP transmission/reception, it is necessary for the respective base stations to share plural pieces of base station information and to communicate with the communication terminal, and in order to share the information between the base stations installed at different places, data transfer through the host device via the wired network becomes necessary.

For example, in a case of attempting to share information, which is sent from a certain base station, by other base station, the information sent from the base station is given once to the host device via the wired network, and is then given to the other base station from the host device, passing through the wired network one more time. Therefore, there has been a problem that it takes a time to share the information to thereby cause a delay.

However, in the wireless communication system shown in FIG. 2, the relay stations RP1 and RP2 are connected to the base station BSX through the wireless entrance lines WLE1 and WLE2, respectively, whereby, in a case where implementation of the CoMP transmission/reception is required, it becomes possible to perform the CoMP transmission/reception by performing the wireless communication with the wireless terminal MS by using the relay stations RP1 and RP2.

In FIG. 2, as an effect by the CoMP transmission/reception, an effect of making it possible to expand a communicable area of the base station is schematically shown. That is to say, in FIG. 2, in a case where the communicable areas of the individual relay stations RP1 and RP2 are AR1 and AR2, if the wireless terminal MS is located at area fringes of the communicable areas AR1 and AR2, then it is anticipated that communication quality may be deteriorated. However, the relay stations RP1 and RP2 perform the CoMP transmission/reception for the wireless terminal MS through the wireless paths P1 and P2, respectively, whereby the relay stations RP1 and RP2 can mutually interpolate the communication quality, can suppress the deterioration of the communication quality, and can substantially expand a communicable area by the relay stations RP1 and RP2. In FIG. 2, the communicable area by the relay stations RP1 and RP2 is shown as AR3.

In this CoMP transmission/reception, similar processing to slot diversity processing for use in a base station of PHS (Personal Handyphone System) is employed, and it is not necessary to set complicated protocol.

That is to say, the slot diversity processing in the base station of the PHS is processing for enhancing link performance by performing communication with one wireless terminal by using a plurality of time slots or a plurality of frequency slots, and in a case of applying this to the CoMP transmission/reception, only a configuration, in which the same data is transmitted from a plurality of relay devices in place of such a plurality of slots, just needs to be adopted. Therefore, unlike the conventional CoMP transmission/reception, it is not necessary to perform the data transfer through the host device via the wired network in order to share the information between the base stations installed at the different places, and it becomes unnecessary to set the complicated protocol.

Moreover, it becomes unnecessary to perform the data transfer through the host device via the wired network in order to share the information between the base stations, and accordingly, such an occurrence of the delay caused by sharing the information can be suppressed. Therefore, a trade-off relationship between rapidity and the communication quality can be improved, and the CoMP transmission/reception can be realized.

Embodiment 1

<Configuration of Communication System>

Figure 3:
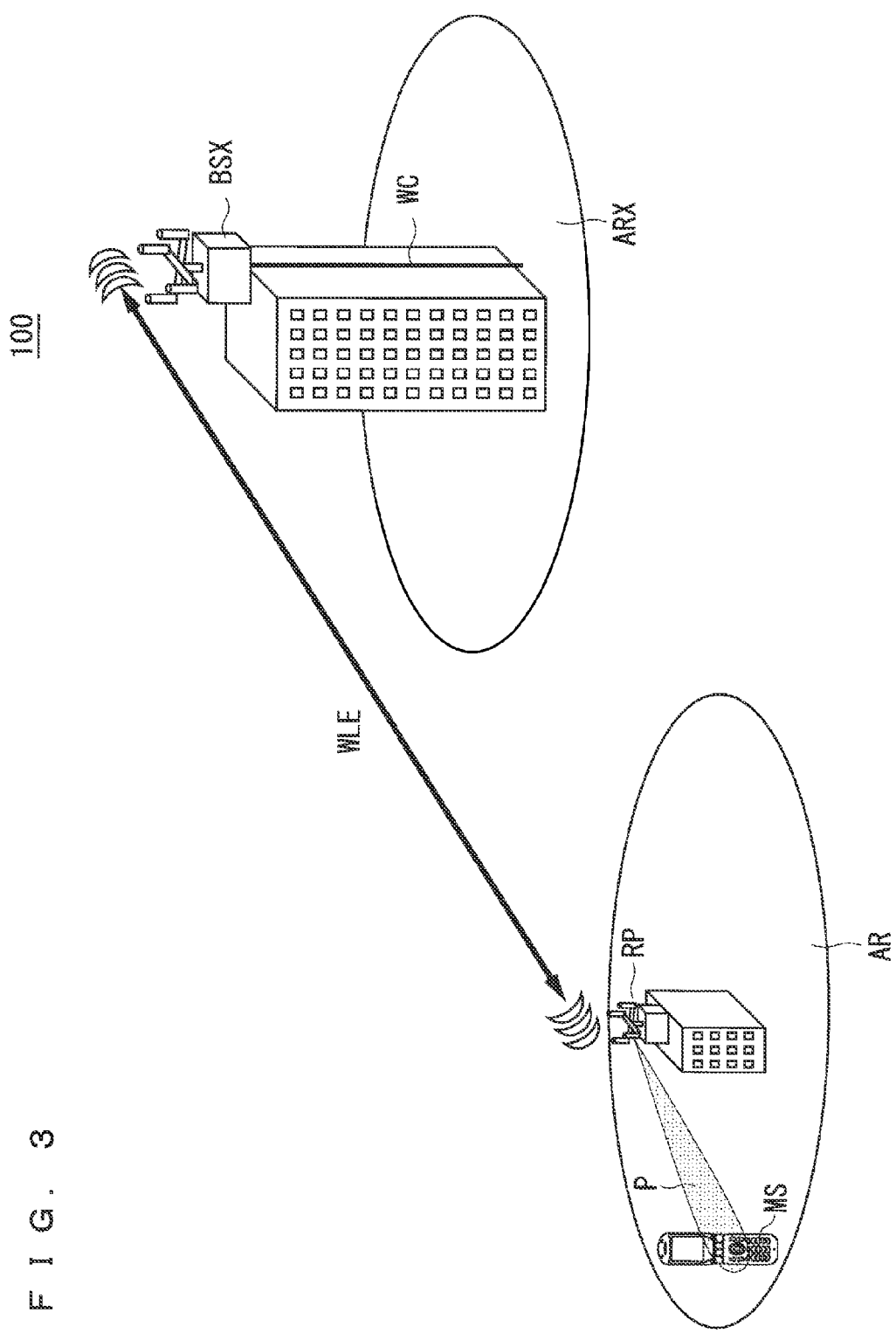
FIG. 3 is a view schematically showing a configuration of a communication system of an embodiment according to the present invention.

FIG. 3 is a view showing a configuration of the wireless communication system of the embodiment according to the present invention. A wireless communication system 100 shown in FIG. 3 includes: the wireless terminal MS; the relay station (wireless entrance station) RP; and the base station BSX as a relay destination base station (master station). The base station BSX is connected to the host device (not shown) through the wired line WC such as the optical line and the ISDN line.

<Configuration of Base Station>

Figure 4:
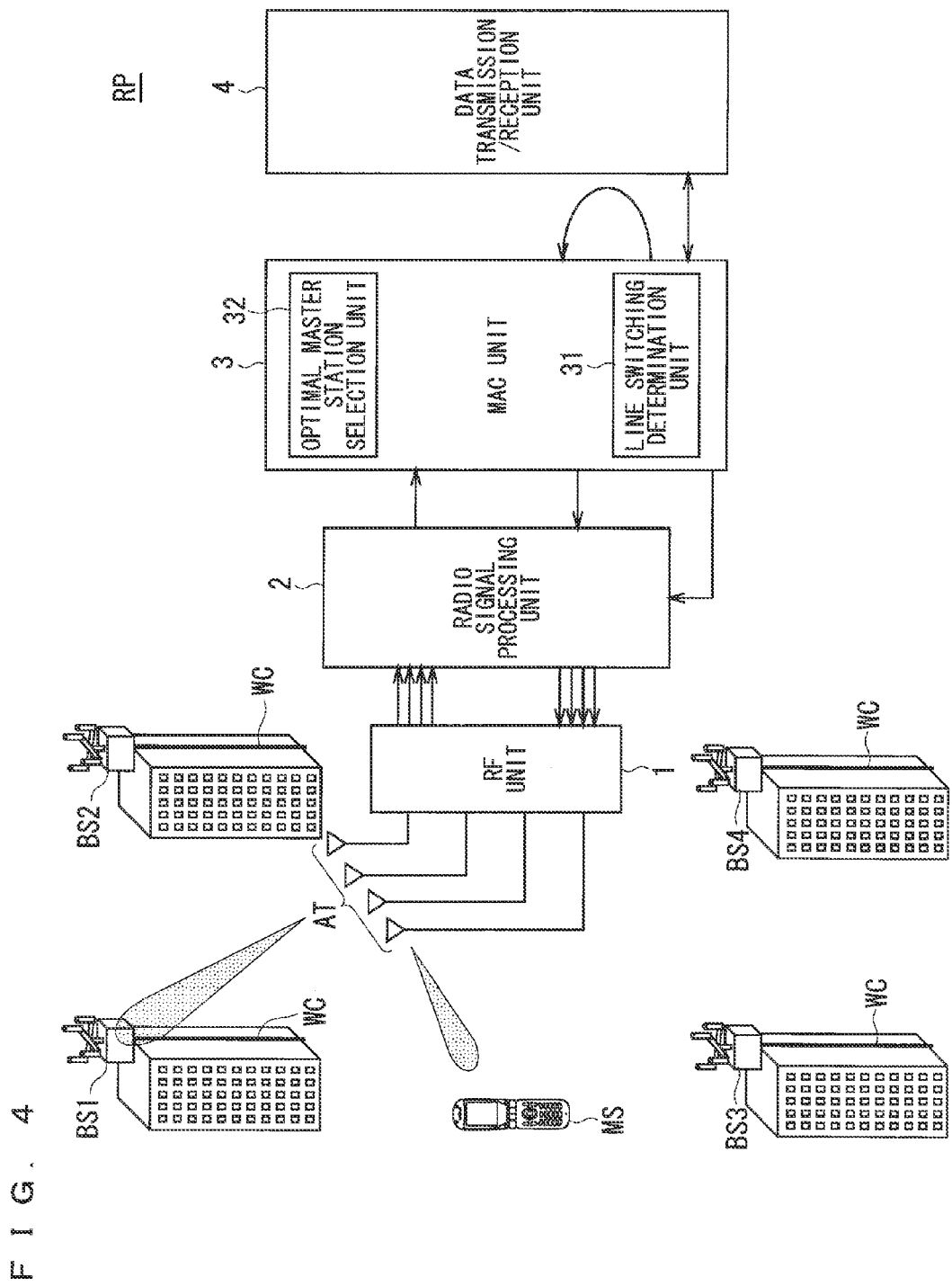
FIG. 4 is a block diagram showing a configuration of a relay station of the embodiment according to the present invention.

FIG. 4 is a block diagram showing a configuration of the relay station RP of the embodiment according to the present invention, and in FIG. 4, only the configuration according to the invention is shown, and other configurations are omitted.

As shown in FIG. 4, the relay station RP includes: an RF unit (wireless communication unit) 1 to which a transmitting/receiving antenna AT is connected; a radio signal processing unit 2 composed of a CPU (Central Processing Unit) or the like, which is connected to the RF unit 1; a MAC unit (Media Access Control) 3 connected to the radio signal processing unit 2; and a data transmission/reception unit 4 connected to the MAC unit 3.

The MAC unit 3 is a region, which is composed of a CPU or the like, and performs communication control according to protocol of a communication mode to be used by the wireless communication system 100, and the MAC unit 3 includes a line switching determination unit 31 and an optimal master station selection unit 32.

In the relay station RP, a received signal received by the transmitting/receiving antenna AT is inputted to a receiving unit (not shown) of the RF unit 1, is subjected to amplification processing and down converting, is converted into a base band signal, and is outputted. Note that the signal received by the transmitting/receiving antenna AT is modulated by a BPSK (Binary Phase Shift Keying) modulation mode, a QPSK (Quadrature Phase Shift Keying) modulation mode, or the like.

Moreover, in accordance with an instruction from the radio signal processing unit 2, the RF unit 1 sends out such a radio signal modulated by the BPSK modulation mode, the QPSK modulation mode or the like. Note that FIG. 4 shows an example of sending the radio signal to the base station BS1 among the base stations BS1 to BS4.

The radio signal processing unit 2 receives the radio signal outputted from the RF unit 1, analyzes a message and data, and notifies an analysis result thereof to the MAC unit 3. Note that the message includes a connection request and disconnection request of the communication from the wireless terminal MS.

The data transmission/reception unit 4 is used in a case of outputting the signal, which is received by the transmitting/receiving antenna AT, to the wired line in accordance with communication control from the MAC unit 3, and in this case, the signal is given to the host device (not shown) through a line exchange (not shown). Note that, in a case of using, as the relay station RP, a relay-dedicated communication device such as a repeater, the data transmission/reception unit 4 is unnecessary; however, in a case where the relay station RP also serves as a base station, and operates as the base station, the data transmission/reception unit 4 becomes necessary.

Moreover, in a case of using the repeater, it is a condition that a region that can operate as the optimal master station selection unit 32 is provided.

The line switching determination unit 31 included in the MAC unit 3 has functions to determine whether the relay station RP functions as a usual base station or as the relay station, and in a case of functioning as the relay station, to switch lines so as not to give the signal, which is received by the transmitting/receiving antenna AT, to the data transmission/reception unit 4, but to return the signal to the MAC unit 3 in order to transmit the signal one more time by the transmitting/receiving antenna AT.

Moreover, the optimal master station selection unit 32 has a function to decide which of the base stations is to be selected as the relay destination base station in a case where a plurality of the base stations are present in the connection range by the wireless entrance line of the relay station RP.

<Consumption of Communication Capacity>

Figure 5:
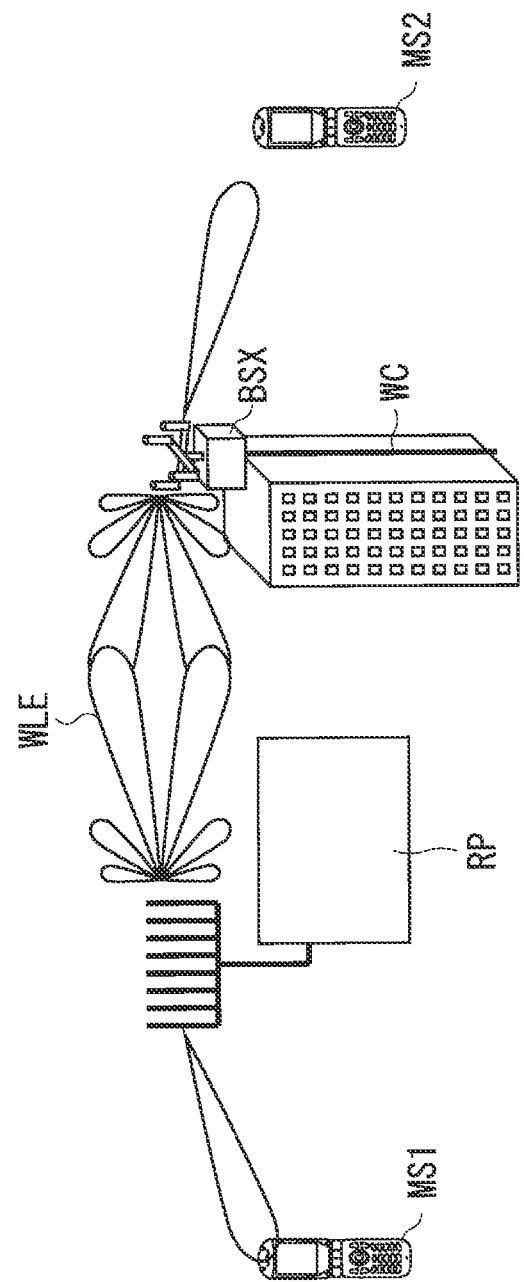
FIG. 5 is a view showing a wireless communication system using the wireless entrance line.

In the wireless communication system using the wireless entrance line, the description has been made of the possibility that the base station may not be able to operate as a usual base station since the communication capacity of the master station is completely consumed for the relay, and a further description is made of this phenomenon by using FIG. 5 to FIG. 7.

FIG. 5 is a view showing a wireless communication system using the wireless entrance line. Note that, in FIG. 5, the same reference numerals are assigned to the same constituents as those of the wireless communication system 100 shown in FIG. 3, and a duplicate description is omitted.

In FIG. 5, the base station BSX opens a wireless entrance line WLE with the relay station RP, and performs communication with a wireless terminal MS1 through the relay station RP, and meanwhile, directly performs wireless communication with a wireless terminal MS2.

FIG. 6 schematically shows a consumption (allocation) state of time slots in such a case. Note that, in the following description, PHS is taken as an example, and it is assumed that each of an uplink (UL) and a downlink (DL) is time-divided into four time slots, that one slot is used for a control channel, and that three slots are used as call channels. Moreover, it is assumed that each of the base station BSX and the relay station RP has two RF units, that each of the RF units can process four slots, and each of the base station BSX and the relay station RP has a communication capacity for an amount of eight slots.

Part (a) of FIG. 6 schematically shows the communication capacity (relay station capacity) of the relay station, and part (b) of FIG. 6 schematically shows the communication capacity (master station capacity) of the master station, in each of which an axis of abscissas becomes a time axis, and an axis of ordinates becomes a frequency axis. Then, one RF unit corresponds to an upper slot row, and the other RF unit corresponds to a lower slot row.

In the relay station capacity, four slots in a left half of part (a) of FIG. 6 are used for the communication (call) between the relay station RP and the wireless terminal MS1, one slot thereamong is used as a control channel (C), and three slots as a rest are used as communication channels (T).

Moreover, four slots in a right half of part (a) of FIG. 6 are used for the relay between the relay station RP and the base station BSX, one slot thereamong is used as a control channel (C), and three slots as a rest are used as communication channels (T).

In the master station capacity, four slots in a left half of part (b) of FIG. 6 are used for the communication (call) between the base station BSX and the wireless terminal MS2, and four slots are used as communication channels (T).

Moreover, four slots in a right half of part (b) of FIG. 6 are used for the relay between the relay station RP and the base station BSX, one slot thereamong is used as a control channel (C), and three slots as a rest are used as communication channels (T).

As described above, in the communication capacity having eight slots in each of the base station BSX and the relay station RP, four slots in each thereof are used for the relay. As a result, the number of slots which the relay station RP can use for the call becomes three, and the number of slots which the base station BS can use for the call becomes four.

Here, in a case of not performing such a relay operation, each of the base station BSX and the relay station RP is set so as to use one slot as the control channel, and to use six slots as the call channels. In comparison with that case, in a case of performing the relay operation, two call channels become unusable in the base station BSX, and three call channels become unusable in the relay station RP.

This result is shown by a list in FIG. 7. As shown in FIG. 7, in the case where there is not a relay operation, totally 12 call channels can be ensured; however, in the case of performing the relay operation, five call channels become unusable.

As described above, in the wireless communication system using the wireless entrance line, the communication capacities are consumed in the base station BSX and the relay station RP for the relay operation, and particularly in the base station BSX, in a case where accesses from the relay stations are concentrated thereto, the communication capacity of the base station BSX is completely consumed.

Accordingly, in the wireless communication system according to the present invention, the base station BSX (master station) as the relay destination is not uniquely fixed in the relay station RP, but an optimal master station is selected from among candidates for the master station in response to circumstances, whereby traffic for the relay is avoided being concentrated to a specific master station, and a communication capacity of the specific master station is prevented from being completely consumed.

<Decision of Optimal Master Station>

While referring to FIG. 3 and FIG. 4, a description is made below of a communication control method in the wireless communication system 100 according to the present invention by using flowcharts shown in FIG. 8 to FIG. 12.

Figure 8:
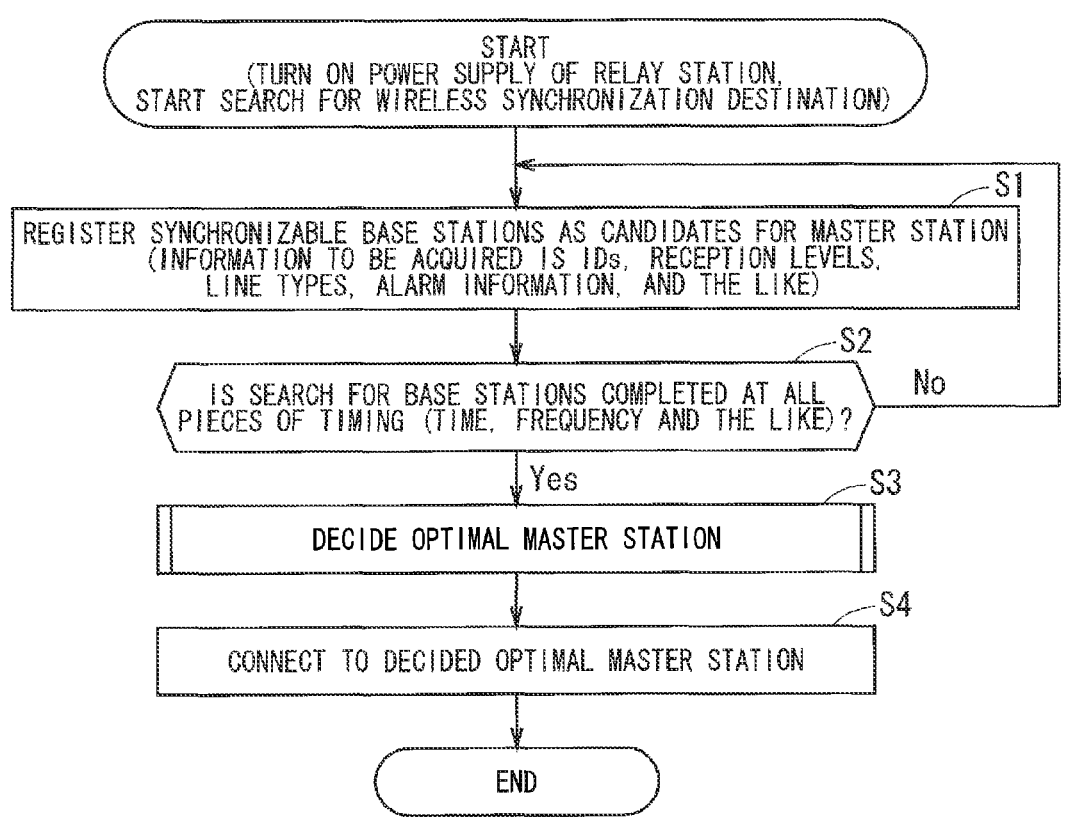
FIG. 8 is a flowchart explaining a communication control method of the wireless communication system of the embodiment according to the present invention.

FIG. 8 is a flowchart explaining the communication control method of the wireless communication system 100 according to the present invention.

First, when a power supply of the relay station RP (FIG. 3) is turned on, search for base stations as wireless synchronization destinations is automatically started. Then, base stations determined to be synchronizable are registered as the candidates for the master station, and priority order setting information (base station IDs, reception levels, available margin information, alarm information, line types, and the like) for setting priority orders regarding those base stations is acquired (Step S1).

After the processing of Step S1 is repeated for all of the base stations, which are located in a search range, at all pieces of timing (time, frequency) (Step S2), and the search for the base stations is completed, the processing then proceeds to Step S3, and the optimal master station is decided from among the plural candidates for the master station in the optimal master station selection unit 32 (FIG. 4) of the MAC unit 3. This decision is made by at least one technique among techniques shown in FIG. 9 to FIG. 12.

After the optimal master station is decided in Step S3, then in Step S4, a connection operation to the optimal master station is performed, whereby a series of the operations are ended; however, in a case where the connection cannot be made since the optimal master station is in the busy state of the slots, and the like, connection to a master station in which a priority order is next high is attempted.

Here, in an event where the relay station RP decides the optimal master station, and performs the connection by the wireless entrance line, the radio signal processing unit 2 (FIG. 4) controls directivity of the transmitting/receiving antenna AT, and opens the wireless entrance line for the base station BSX.

As the transmitting/receiving antenna AT, for example, an array antenna composed of a plurality of antenna elements is used, and a beam direction of the antenna is adjusted, whereby the transmission/reception of the signal can be selectively performed with a desired base station.

Moreover, in the relay station RP, in a case where the wireless entrance line is opened with the base station BSX, and the radio signal from the wireless terminal MS is relayed to the base station BSX, when the radio signal is received from the wireless terminal MS, the line switching determination unit 31 of the MAC unit 3 switches the line so as to return the signal, which is received by the transmitting/receiving antenna AT, to the MAC unit 3 in order that the signal can be transmitted from the transmitting/receiving antenna AT toward the base station BSX. On the contrary, when the radio signal is received from the base station BSX, the line switching determination unit 31 of the MAC unit 3 switches the line so as to return the signal, which is received by the transmitting/receiving antenna AT, to the MAC unit 3 in order that the signal can be transmitted from the transmitting/receiving antenna AT toward the wireless terminal MS.

Next, by using the flowcharts shown in FIG. 9 to FIG. 12, a description is made of variations of the optimal master station decision processing of Step S3.

FIRST EXAMPLE

Figure 9:
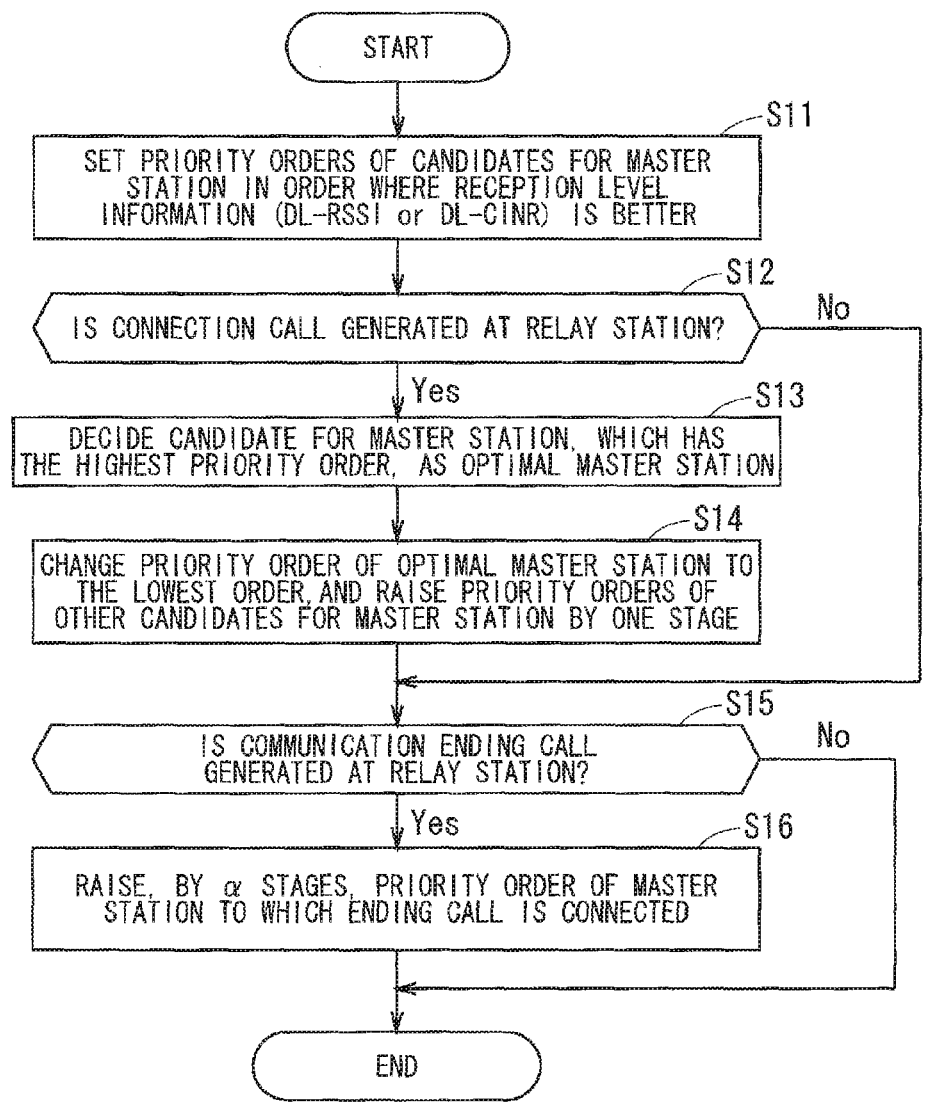
FIG. 9 is a flowchart explaining a first example of optimal master station decision processing.

FIG. 9 shows an example of deciding the priority orders of the master stations based on the reception level information acquired in Step S1 (FIG. 8), where, for the plurality of synchronizable base stations, higher priority orders are set as candidates for the master station as a connection target in order where RSSIs (Received Signal Strength Indications) of downlink signals from the respective base stations or CINR (Carrier to Interference-plus-Noise Ratios) of the downlink signals are better (Step S11).

Then, it is confirmed whether or not a connection call to the base station is generated in the relay station (whether or not the connection request to the base station has come from the wireless terminal) (Step S12), and in a case where the connection call is generated, a candidate for the master station, which has a highest priority order, is decided as the optimal master station (Step S13).

Thereafter, with regard to the master station that has become the optimal master station, the priority order thereof is changed to a lowest order, priority orders of the other candidates for the master station are raised by one stage, and new priority orders are decided (Step S14). As described in Step S4 of FIG. 8, in the case where the connection to the selected optimal master station cannot be made, a re-connection is attempted in accordance with the new priority orders.

Meanwhile, in a case where the connection call is not generated in Step S12, the processing proceeds to Step S15, where it is confirmed whether or not a communication ending call to the base station is generated in the relay station (whether or not the disconnection request for the base station has come from the wireless terminal). Then, in a case where the communication ending call is generated, a priority order of the master station to which the ending call is connected is raised by α stages (Step S16). Here, to raise the priority order by α stages stands for to raise the priority order by a predetermined number of stages or more, and is measured for making it possible to preferentially connect to the master station, which is disconnected by the communication ending call, since the master station has an available slot. Note that the predetermined number of stages is not limited to integers (1, 2, 3 . . . ), but also includes cases of decimals (0.1, 0.2 . . . ). That is to say, for example, if it is defined that the priority order is raised by 0.2 stages every time when the communication ending call is generated one time, then the priority order is raised by one stage by the fact that the communication ending call is generated five times.

In a case where the communication ending call is not generated, and after the new priority orders are decided in Step S16, a series of the operations are ended; however, the processing on and after Step S13 is repeated every time when the connection call to the base station is generated in the relay station RP.

SECOND EXAMPLE

Figure 10:
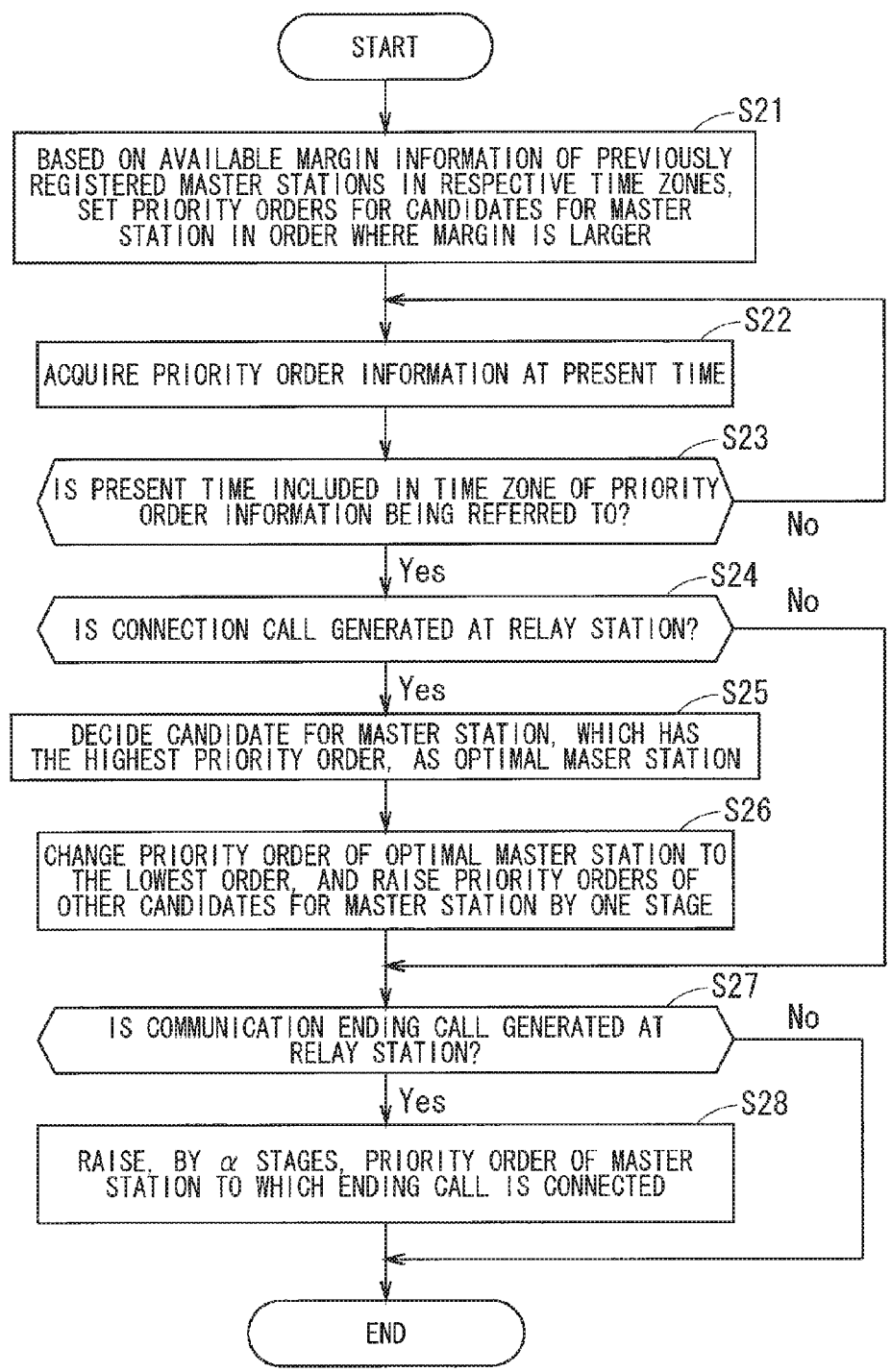
FIG. 10 is a flowchart explaining a second example of the optimal master station decision processing.

FIG. 10 shows an example of deciding the priority orders of the master stations based on the available margin information of the channels (slots) of the respective previously registered master stations in the respective time zones of a day.

First, in Step S21, based on the available margin information of the channels (slots) of the respective master stations, which are previously registered in the relay station RP, in the respective time zones of a day, for the plurality of synchronizable base stations, higher priority orders are set as the candidates for the master station as the connection target in order where the available margin is larger.

Here, the host device connected to the wired network grasps past traffic information of the respective base stations, can determine therefrom the available margin information of the channels (slots) of the respective base stations in the respective time zones of a day, and can give the available margin information to the respective relay stations through the wired network (or wirelessly). In each of the relay stations, this information is registered in a storage device in an inside thereof, whereby it becomes possible to perform the processing of Step S21. This information becomes more accurately processable by being previously registered as information for each day of the week or for each month in a case where it is possible that the information may differ depending on a day of the week or a month; however, in the following, a description is made on the assumption that the priority orders are set based on the available margin information in the respective time zones of a day for the sake of simplification.

Note that the available margin information may be those in time zones obtained by dividing 24 hours in a unit of one hour, may be those in time zones obtained by dividing 24 hours in a unit of a broader time such as two to three hours, or may be those in time zones obtained by dividing 24 hours in a unit of a finer time such as 30 minutes and 15 minutes.

Next, from among such pieces of the priority order information of the candidates for the master station, which are set in Step S21, priority order information corresponding to the present time is acquired (Step S22).

Then, it is confirmed whether or not the present time is included in the time zone of the priority order information of the candidate for the master station, which is being referred to (Step S23), and in a case where the present time is included therein, the processing proceeds to Step S24, and in a case where the present time is not included therein, such an operation of Step S22 is repeated, and the priority order information of the candidate for the master station in the time zone in which the present time is included is acquired.

Next, it is confirmed whether or not the connection call to the base station is generated in the relay station (whether or not the connection request to the base station has come from the wireless terminal) (Step S24), and in the case where the connection call is generated, the candidate for the master station, which has the highest priority order, is decided as the optimal master station (Step S25).

Thereafter, with regard to the master station that has become the optimal master station, the priority order thereof is changed to the lowest order, the priority orders of the other candidates for the master station are raised by one stage, and new priority orders are decided (Step S26). As described in Step S4 of FIG. 8, in the case where the connection to the selected optimal master station cannot be made, the re-connection is attempted in accordance with the new priority orders.

Meanwhile, in a case where the connection call is not generated in Step S24, the processing proceeds to Step S27, where it is confirmed whether or not the communication ending call to the base station is generated in the relay station (whether or not the communication disconnection request for the base station has come from the wireless terminal). Then, in the case where the communication ending call is generated, the priority order of the master station to which the ending call is connected is raised by α stages, and new priority orders are decided (Step S28). Here, to raise the priority order by α stages stands for to raise the priority order by a predetermined number of stages or more, and is measured for making it possible to preferentially connect to the master station, which is disconnected by the communication ending call, since the master station has an available slot. Note that the predetermined number of stages is not limited to integers (1, 2, 3 . . . ), but also includes the cases of decimals (0.1, 0.2 . . . ). That is to say, for example, if it is defined that the priority order is raised by 0.2 stages every time when the communication ending call is generated one time, then the priority order is raised by one stage by the fact that the communication ending call is generated five times.

In the case where the communication ending call is not generated, and after the new priority orders are decided in Step S28, a series of the operations are ended; however, the processing on and after Step S25 is repeated every time when the connection call to the base station is generated in the relay station RP.

THIRD EXAMPLE

Figure 11:
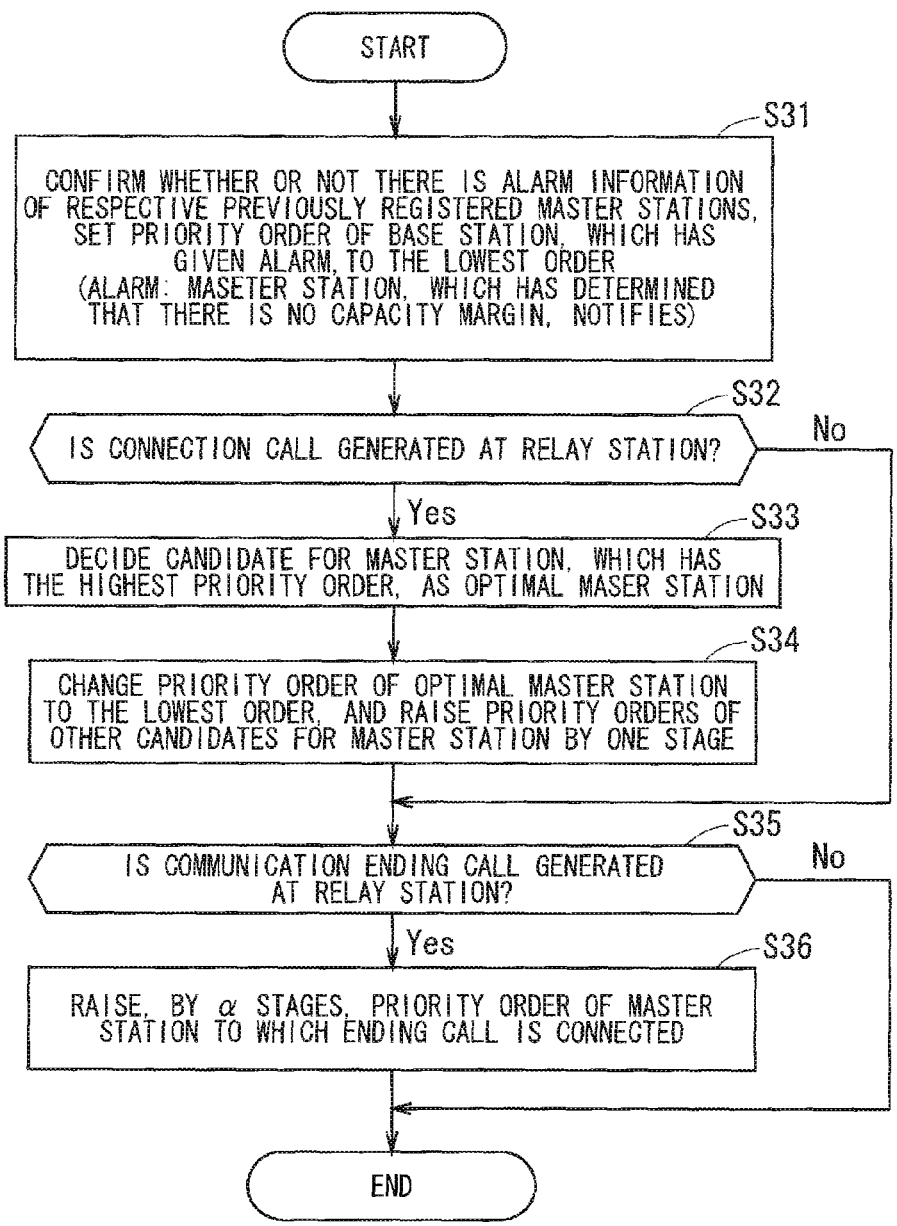
FIG. 11 is a flowchart explaining a third example of the optimal master station decision processing.

FIG. 11 shows an example of deciding the priority orders of the master stations based on whether or not there is alarm information from the respective previously registered master stations.

First, in Step S31, it is confirmed whether or not there is alarm information in the respective time zones of a day in the respective master stations previously registered in the relay station RP, and among the plurality of synchronizable base stations, a priority order of a base station that has given an alarm is set as a lowest order of the candidates for the master station as the connection target.

Here, the alarm is a signal to be issued as notification information to the respective relay stations in a case where the master station has determined that there is no margin for the communication capacity, and is given in such a manner that the host device connected to the wired network previously instructs the respective base stations to give this alarm, for example, in a case where a loading rate has reached 70%.

The alarm information includes not only information as to whether or not the alarm is given but also the number of times that a plurality of the alarms are issued in a case where the plurality of alarms are issued from the same base station in the same time zone. The base station that issues the plurality of alarms in the same time zone is considered to be a base station to which the connections are concentrated, and accordingly, such a base station, in which the number of alarm issuance times is larger, is set at the lower order of the candidates for the master station. As a matter of course, in a case where only one base station among the plurality of base stations issues an alarm, this base station is set at the lowest order of the candidates for the master station as the connection target. In such a case, and a case where the other base stations issue alarms the same number of times, the orders of the other base stations become the same. In this case, it is considered to set higher priority orders for the base stations as the candidates for the master station as the connection target, for example, in a closer order from the relay station. Moreover, upper priority orders may be decided based on the reception level information as in Step S11 shown in FIG. 9.

In each of the relay stations, past alarm information acquired from the respective base stations is registered as the alarm information for each of the time zones of a day in the storage device in the inside thereof, whereby it becomes possible to perform the processing of Step S31.

This alarm information becomes more accurately processable by being previously registered as the information for each day of the week or for each month in a case where it is possible that the alarm information may differ depending on a day of the week or a month.

Moreover, the alarm information may be those in the time zones obtained by dividing 24 hours in a unit of one hour, may be those in the time zones obtained by dividing 24 hours in a unit of the broader time such as two to three hours, or may be those in the time zones obtained by dividing 24 hours in a unit of the finer time such as 30 minutes and 15 minutes.

Next, it is confirmed whether or not the connection call to the base station is generated in the relay station (whether or not the connection request to the base station has come from the wireless terminal) (Step S32), and in the case where the connection call is generated, the candidate for the master station, which has the highest priority order, is decided as the optimal master station (Step S33).

Thereafter, with regard to the master station that has become the optimal master station, the priority order thereof is changed to the lowest order, the priority orders of the other candidates for the master station are raised by one stage, and new priority orders are decided (Step S34). As described in Step S4 of FIG. 8, in the case where the connection to the selected optimal master station cannot be made, the re-connection is attempted in accordance with the new priority orders.

Meanwhile, in a case where the connection call is not generated in Step S32, the processing proceeds to Step S35, where it is confirmed whether or not the communication ending call to the base station is generated in the relay station (whether or not the communication disconnection request for the base station has come from the wireless terminal). Then, in the case where the communication ending call is generated, the priority order of the master station to which the ending call is connected is raised by α stages, and new priority orders are decided (Step S36). Here, to raise the priority order by α stages stands for to raise the priority order by a predetermined number of stages or more, and is measured for making it possible to preferentially connect to the master station, which is disconnected by the communication ending call, since the master station has an available slot. Note that the predetermined number of stages is not limited to integers (1, 2, 3 . . . ), but also includes the cases of decimals (0.1, 0.2 . . . ). That is to say, for example, if it is defined that the priority order is raised by 0.2 stages every time when the communication ending call is generated one time, then the priority order is raised by one stage by the fact that the communication ending call is generated five times.

In the case where the communication ending call is not generated, and after the new priority orders are decided in Step S36, a series of the operations are ended; however, the processing on and after Step S33 is repeated every time when the connection call to the base station is generated in the relay station RP.

FOURTH EXAMPLE

Figure 12:
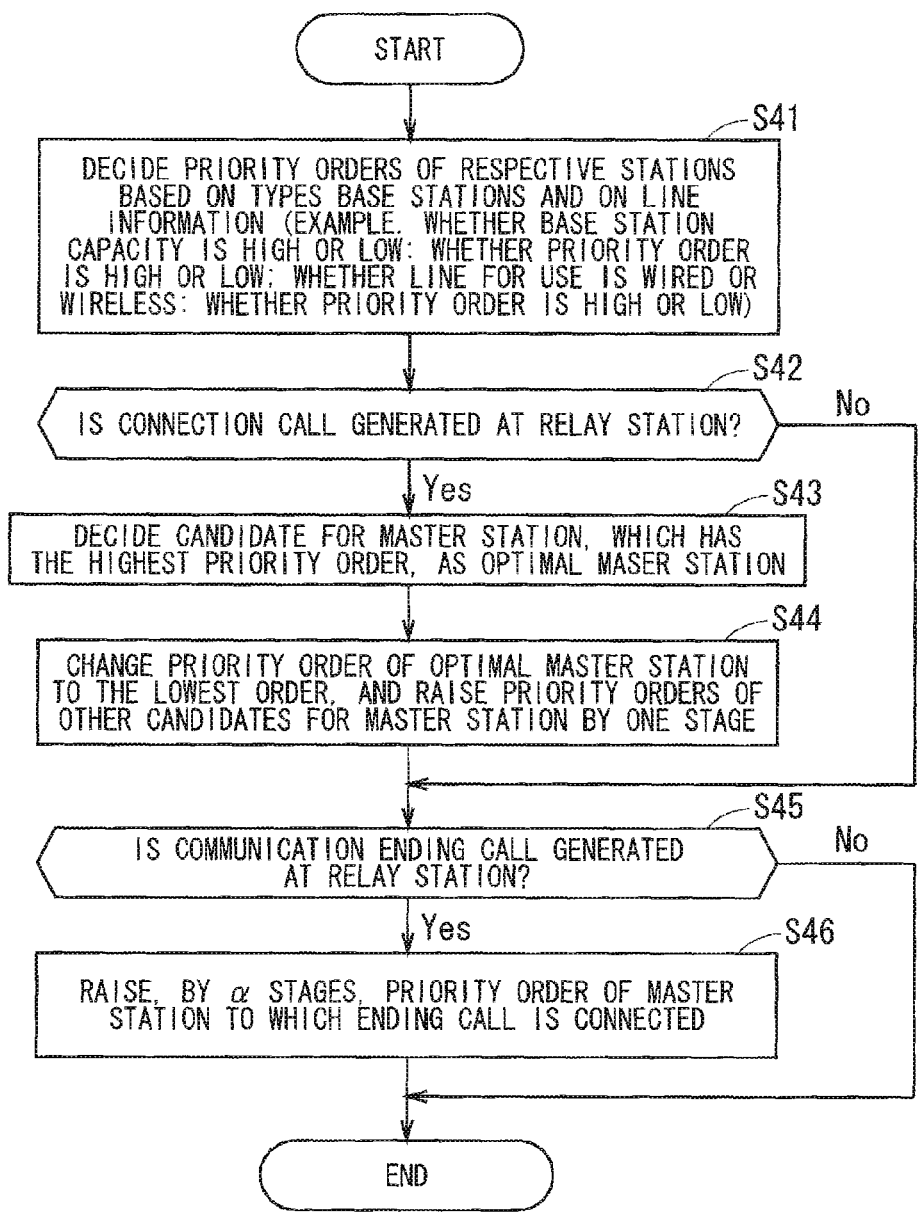
FIG. 12 is a flowchart explaining a fourth example of the optimal master station decision processing.

FIG. 12 shows an example of deciding the priority orders of the master stations based on types of the respective base stations and on line information.

First, in Step S41, the priority orders of the master stations are decided based on information of the types of the respective base stations and information of a type of the line, which are previously registered in the relay station RP.

Here, with regard to the types of the base stations, the base stations can be classified based on capabilities intrinsic thereto, for example, classified into a base station with a high communication capacity and a base station with a low communication capacity. A higher priority order is given to the base station with a higher communication capacity, and a priority order of the base station with a lower communication capacity is set lower. With regard to the communication capacity, for example as described by using FIG. 6, the base station including two RF units has the communication capacity for the amount of eight slots; however, a base station including only one RF unit has only a communication capacity for an amount of four slots. Therefore, with regard to the former base station, a priority order thereof is set higher, and with regard to the latter base station, a priority order thereof is set lower.

Moreover, the type of the line can be classified based on whether the line for use in the transfer of the signal between the base stations is wired or wireless. With regard to a base station using a wired line, a priority order thereof is enhanced, and with regard to a base station using a wireless line, a priority order thereof is set lower.

Next, it is confirmed whether or not the connection call to the base station is generated in the relay station (whether or not the connection request to the base station has come from the wireless terminal) (Step S42), and in the case where the connection call is generated, the candidate for the master station, which has the highest priority order, is decided as the optimal master station (Step S43).

Thereafter, with regard to the master station that has become the optimal master station, the priority order thereof is changed to the lowest order, the priority orders of the other candidates for the master station are raised by one stage, and new priority orders are decided (Step S44). As described in Step S4 of FIG. 8, in the case where the connection to the selected optimal master station cannot be made, the re-connection is attempted in accordance with the new priority orders.

Meanwhile, in a case where the connection call is not generated in Step S42, the processing proceeds to Step S45, where it is confirmed whether or not the communication ending call to the base station is generated in the relay station (whether or not the communication disconnection request for the base station has come from the wireless terminal). Then, in the case where the communication ending call is generated, the priority order of the master station to which the ending call is connected is raised by α stages, and new priority orders are decided (Step S46). Here, to raise the priority order by α stages stands for to raise the priority order by a predetermined number of stages or more, and is measured for making it possible to preferentially connect to the master station, which is disconnected by the communication ending call, since the master station has an available slot. Note that the predetermined number of stages is not limited to integers (1, 2, 3 . . . ), but also includes the cases of decimals (0.1, 0.2 . . . ). That is to say, for example, if it is defined that the priority order is raised by 0.2 stages every time when the communication ending call is generated one time, then the priority order is raised by one stage by the fact that the communication ending call is generated five times.

In the case where the communication ending call is not generated, and after the new priority orders are decided in Step S46, a series of the operations are ended; however, the processing on and after Step S43 is repeated every time when the connection call to the base station is generated in the relay station RP.

The invention claimed is:

1. A wireless communication system comprising:
a wireless terminal;
a plurality of base stations which perform wireless communication with said wireless terminal; and
a relay station that relays the wireless communication between said plurality of base stations and said wireless terminal,
wherein said relay station includes:
a control unit that defines a wirelessly communicable base station among said plurality of base stations as a candidate for a master station, in a case where a plurality of the candidates for the master station are present, acquires priority order setting information for setting priority orders of connection regarding the respective candidates for the master station, and sets the priority orders of said connection based on the priority order setting information, and
in a case where said relay station has received a connection request from said wireless terminal,
said control unit decides a candidate for the master station, the candidate having a highest priority order of said connection, as an optimal master station, and performs wireless connection to the optimal master station.

2. The wireless communication system according to claim 1,
wherein said priority order setting information includes received signal strength indications of downlink signals from said plurality of base stations or carrier to interference-plus-noise ratios of the downlink signals, and
said control unit sets the priority orders of said connection so that the priority orders can be higher in order where said received signal strength indications or said carrier to interference-plus-noise ratios are better.

3. The wireless communication system according to claim 1,
wherein said priority order setting information includes past available margin information in respective time zones of a day in said plurality of base stations, and
said control unit sets the priority orders of said connection so that the priority orders can be higher in order where available margins are larger.

4. The wireless communication system according to claim 1,
wherein said plurality of base stations issue alarms as notification information to said relay station in a case of having determined that there is no margin for communication capacities,
said priority order setting information includes past alarm information in respective time zones of a day in said plurality of base stations,
said alarm information includes whether or not to have issued said alarms and a number of alarm issuance times in a same time zone, and
said control unit sets the priority orders of said connection to be lower, the priority orders being concerned with the base stations which have issued said alarms, and in addition, sets the priority orders of said connection to be lower in order where the number of alarm issuance times is larger in the same time zone.

5. The wireless communication system according to claim 1,
wherein said priority order setting information includes information of types of said plurality of base stations and of a type of a line for said plurality of base stations,
the types of said base stations are classified based on whether a communication capacity is higher or lower,
the type of said line is classified based on whether a line for use is wired or wireless,
said control unit sets the priority order of said connection to be higher, the priority order being concerned with a base station having a first capacity as a communication capacity, and sets the priority order of said connection to be lower, the priority order being concerned with a base station having a second capacity lower than said first capacity, and
sets the priority order of said connection to be higher, the priority order being concerned with a base station in which the line for use is wired, and sets the priority order of said connection to be lower, the priority order being concerned with a base station in which the line for use is wireless.

6. The wireless communication system according to claim 1,
wherein, after deciding said optimal master station, said control unit changes the priority order of said connection of said optimal master station to a lowest order, raises the priority orders of said connection of other candidates for the master station individually by one stage, and sets new priority orders of the connection.

7. The wireless communication system according to claim 1,
wherein, in a case where wireless communication with any of said plurality of base stations is ended after setting the priority orders of said connection, said control unit raises the priority order of said connection by a predetermined number of stages, the priority order being concerned with the base station in which the communication is ended, and sets new priority orders of the connection.

8. A communication control method of a wireless communication system including:
a wireless terminal;
a plurality of base stations which perform wireless communication with said wireless terminal; and
a relay station that relays the wireless communication between said plurality of base stations and said wireless terminal,
the communication control method comprising the steps of:

(a) in said relay station, defining a wirelessly communicable base station among said plurality of base stations as a candidate for a master station, in a case where a plurality of the candidates for the master station are present, acquiring priority order setting information for setting priority orders of connection regarding the respective candidates for the master station, and setting the priority orders of said connection based on the priority order setting information; and (b) in said relay station, in a case where said relay station has received a connection request from said wireless terminal, deciding a candidate for the master station, the candidate having a highest priority order of said connection, as an optimal master station, and performing wireless connection to the optimal master station.

9. A relay station that relays wireless communication between a plurality of base stations and a wireless terminal, the relay station comprising:

a control unit that defines a wirelessly communicable base station among said plurality of base stations as a candidate for a master station, in a case where a plurality of the candidates for the master station are present, acquires priority order setting information for setting priority orders of connection regarding the respective candidates for the master station, and sets the priority orders of said connection based on the priority order setting information, in a case where said relay station has received a connection request from said wireless terminal, said control unit decides a candidate for the master station, the candidate having a highest priority order of said connection, as an optimal master station, and performs wireless connection to the optimal master station.

* * * * *